United States Patent
Shih et al.

(10) Patent No.: US 7,817,342 B2
(45) Date of Patent: Oct. 19, 2010

(54) TWO-ELEMENT F-THETA LENS USED FOR MICRO-ELECTRO MECHANICAL SYSTEM (MEMS) LASER SCANNING UNIT

(75) Inventors: Bo-Yuan Shih, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 62 days.

(21) Appl. No.: 12/421,985

(22) Filed: Apr. 10, 2009

(65) Prior Publication Data
US 2010/0085621 A1   Apr. 8, 2010

(30) Foreign Application Priority Data
Oct. 3, 2008   (TW) .............................. 97138330 A

(51) Int. Cl.
G02B 9/00   (2006.01)
G02B 26/08   (2006.01)
(52) U.S. Cl. .................. 359/662; 359/206.1; 359/207.3
(58) Field of Classification Search .............. 359/206.1, 359/207.1, 207.2, 207.3, 207.5, 207.6, 662
See application file for complete search history.

(56) References Cited

U.S. PATENT DOCUMENTS

| | | | |
|---|---|---|---|
| 6,295,116 B1 | 9/2001 | Eom | |
| 6,377,293 B2 | 4/2002 | Koh et al. | |
| 6,844,951 B2 | 1/2005 | Cannon et al. | |
| 6,956,597 B2 | 10/2005 | Bush et al. | |
| 7,064,876 B2 | 6/2006 | Cannon et al. | |
| 7,079,171 B2 | 7/2006 | Sung et al. | |
| 7,184,187 B2 | 2/2007 | Cannon et al. | |
| 7,190,499 B2 | 3/2007 | Deng et al. | |
| 7,679,803 B2 * | 3/2010 | Shih et al. ................ | 359/206.1 |
| 2006/0033021 A1 | 2/2006 | Chee | |
| 2006/0279826 A1 | 12/2006 | Kim | |
| 2007/0008401 A1 | 1/2007 | Cannon et al. | |
| 2010/0033793 A1 * | 2/2010 | Shih et al. ................ | 359/206.1 |

FOREIGN PATENT DOCUMENTS

| | | |
|---|---|---|
| JP | 2006201350 | 8/2006 |
| TW | I198966 | 1/1993 |
| TW | M253133 | 12/2004 |

OTHER PUBLICATIONS

English abstract of JP2006201350.

* cited by examiner

*Primary Examiner*—David N Spector
(74) *Attorney, Agent, or Firm*—WPAT, P.C.; Anthony King

(57) ABSTRACT

A two-element f-θ lens used for a micro-electro mechanical system (MEMS) laser scanning unit includes a first lens and a second lens, the first lens is a biconvex lens, the second lens is a meniscus lens of which the concave surface is disposed on a side of a MEMS mirror, at least one optical surface is an Aspherical surface in both main scanning direction and sub scanning direction, and satisfies special optical conditions. The two-element f-θ lens corrects the nonlinear relationship between scanned angle and the time into the linear relationship between the image spot distances and the time. Meanwhile, the two-element f-θ lens focuses the scan light to the target in the main scanning and sun scanning directions, such that the purpose of the scanning linearity effect and the high resolution scanning can be achieved.

5 Claims, 11 Drawing Sheets

TWO-ELEMENT F-THETA LENS USED FOR MICRO-ELECTRO MECHANICAL SYSTEM (MEMS) LASER SCANNING UNIT

FIELD OF THE INVENTION

The present invention relates to a two-element fθ lens used for a micro-electro mechanical system (MEMS) laser scanning unit (LSU), and more particularly to a two-element fθ lens using an angular change varying with time in a sinusoidal relation for correcting a MEMS reflecting mirror having a simple harmonic movement to achieve the scanning linearity effect by the laser scanning unit.

DESCRIPTION OF THE RELATED ART

At present, a laser scanning unit (LSU) used by a laser beam printer (LBP) controls a laser beam scanning by a high-speed rotating polygon mirror as disclosed in U.S. Pat. Nos. 7,079,171, 6,377,293 and 6,295,116 or TW Pat No. 1198966, and principles of those inventions are described as the following: a semiconductor laser emits a laser beam through a collimator and an aperture to form parallel beams. After the parallel beams pass through a cylindrical lens, the beams are focused at the width of the X-axis in the sub scanning direction and along a direction parallel to the Y-axis of the main scanning direction to form a line image and projected onto a high-speed rotating polygon mirror. The polygon mirror includes a plurality of continuous reflecting mirrors disposed substantially at or proximate to the focusing position of the line image. The polygon mirror is provided for controlling the direction of projecting the laser beam, so that when a plurality of continuous reflecting mirrors are rotated at high speed, the laser beam projected onto a reflecting mirror can be extended in a direction parallel to the main scanning direction (Y-axis) at the same angular velocity and deviated from and reflected onto a fθ linear scanning lens. The fθ linear scanning lens is installed next to the polygon mirror and may be either a single-element lens structure (or a single scanning lens) or a two-element lens structure. The function of this fθ linear scanning lens is to focus a laser beam reflected by the reflecting mirror of the polygon mirror and projected onto the fθ lens into an oval spot that is projected onto a photoreceptor (or a photoreceptor drum, which is an image surface) to achieve the requirement of the scanning linearity. However, the traditional laser scanning unit (LSU) still has the following drawbacks in its practical use.

(1) The manufacture of the rotating polygon mirror incurs a high level of difficulty and a high cost, and thus increasing the manufacturing cost of the LSU.

(2) The polygon mirror requires a function of a high-speed rotation (such as 40000 rpm) and a high precision, and thus a cylindrical lens is required and installed to the traditional LSU since the width of the general polygon mirror along the Y-axis of the reflecting surface of the mirror is very thin, so that the laser beam pass through the cylindrical lens can be focused and concentrated into a line (or a spot on the Y-axis) and projected onto the reflecting mirror of the polygon mirror. Such arrangement increases the number of components and also complicates the assembling operation procedure.

(3) The traditional polygon mirror requires a high-speed rotation (such as 40000 rpm), and thus the noise level is raised. Furthermore, the polygon mirror takes a longer time to be accelerated from a starting speed to an operating speed, and thus increasing the booting time of the laser scanning.

(4) In the fabrication of the traditional LSU, the central axis of a laser beam projected onto the reflecting mirror of the polygon mirror is not aligned precisely with the central rotating axis of the polygon mirror, so that it is necessary to take the off axis deviation of the polygon mirror into consideration for the design of the fθ lens, and thus increasing the difficulty of design and manufacturing the fθ lens.

In recent years, an oscillatory MEMS reflecting mirror is introduced to overcome the shortcomings of the traditional LSU assembly and replace the laser beam scanning controlled by the traditional polygon mirror. The surface of a torsion oscillator of the MEMS reflecting mirror comprises a reflecting layer, and the reflecting layer is oscillated for reflecting the light and further for the scanning. In the future, such arrangement will be applied in a laser scanning unit (LSU) of an imaging system, a scanner or a laser printer, and its scanning efficiency is higher than the traditional rotating polygon mirror. As disclosed in the U.S. Pat. Nos. 6,844,951 and 6,956,597, at least one driving signal is generated, and its driving frequency approaches the resonant frequency of a plurality of MEMS reflecting mirrors, and the driving signal drives the MEMS reflecting mirror to produce a scanning path. In U.S. Pat. Nos. 7,064,876, 7,184,187, 7,190,499, 2006/0033021, 2007/0008401 and 2006/0279826 or TW Pat No. 253133, or Jp Pat. No. 2006-201350, a MEMS reflecting mirror installed between a collimator and a fθ lens of a LSU module replaces the traditional rotating polygon mirror for controlling the projecting direction of a laser beam. The MEMS reflecting mirror features the advantages of small components, fast rotation, and low manufacturing cost. However, after the MEMS reflecting mirror is driven by the received voltage for a simple harmonic with a sinusoidal relation of time and angular speed, and a laser beam projected on the MEMS reflecting mirror is reflected with a relation of reflecting angle θ(t) and time as follows $$\theta(t) = \theta_s \cdot \sin(2\pi \cdot f \cdot t) \tag{1}$$

wherein, f is the scanning frequency of the MEMS reflecting mirror and $\theta_s$ is the maximum scanning angle at a single side (symmetrical with the optical Z axis) after the laser beam passes through the MEMS reflecting mirror.

In the same time interval Δt, the corresponding variation of the reflecting angle is not the same but decreasing, and thus constituting a sinusoidal relation with time. In other words, the variation of the reflecting angle in the same time interval Δt is $\Delta\theta(t) = \theta_s \cdot (\sin(2\pi \cdot f \cdot t_1) - \sin(2\pi \cdot f \cdot t_2))$, which constitutes a non-linear relation with time. If the reflected light is projected onto the target from a different angle, the distance from the spot will be different in the same time interval due to the different angle.

Since the angle of the MEMS reflecting mirror situated at a peak and a valley of a sine wave varies with time, and the rotating movements if a traditional polygon mirror are at a constant angular speed, if a traditional fθ lens is installed on a laser scanning unit (LSU) of the MEMS reflecting mirror, the angle of the MEMS reflecting mirror produced by the sinusoidal relation varied with time cannot be corrected, so that the speed of laser beam projected on an image side will not an uniform speed scanning, and the image on the image side will be deviated. Therefore, the laser scanning unit or the MEMS laser scanning unit (MEMS LSU) composed of MEMS reflecting mirrors has a characteristic that after the laser beam is scanned by the MEMS reflecting mirror, scan lights at different angles are formed in the same time. Thus, finding a way of developing a fθ lens (some prior art named as f-sin θ lens) for the MEMS laser scanning unit to correct the scan lights, such that a correct image will be projected onto the light, examples as, U.S. Pat. No. 7,184,187 provided a polynomial surface for fθ lens to adjust the angular velocity variation in the main-scanning direction only. However, the laser light beam is essential an oval-like shape of the cross section that corrects the scan lights in the main-scanning direction only may not be achieve the accuracy requirement. Since, a fθ lens with main-scanning direction correcting as well as sub-scanning direction correcting demands immediate attentions and feasible solutions.

SUMMARY OF THE INVENTION

The primary objective of the present invention is to overcome the shortcomings of the prior art by providing a two-element lens used for a micro-electro mechanical system (MEMS) laser scanning unit, which comprises a first lens in a biconvex shape, and a second lens in a meniscus shape having a concave surface on a side of a MEMS mirror, counted from the MEMS reflecting mirror, for projecting a scan light reflected by the MEMS reflecting mirror onto the correct image of a target to achieve a scanning linearity effect required by the laser scanning unit.

Another objective of the present invention is to provide a two-element fθ lens used for a micro-electro mechanical system (MEMS) laser scanning unit for reducing the area of a spot projected onto the target to achieve the effect of improving the resolution.

A further object of the present invention is to provide a two-element fθ lens used for a MEMS laser scanning unit, and the two-element fθ lens can make a distortion correction to correct optical axis caused by the deviation of the scan light resulting in the problems of an increased deviation of the main scanning direction and the sub scanning direction, and a change of a spot of a drum at the image into an oval like shape, and the two-element fθ lens can unify the size of each image spot to achieve the effect of enhancing the image quality.

Therefore, the two-element lens used for a micro-electro mechanical system (MEMS) laser scanning unit of the invention is applicable for a light source comprising an emitting laser beam, wherein a resonant oscillation is used for reflecting the laser beam of the light source onto MEMS reflecting mirror of the scan light to form an image on the target. As to a laser printer, the target is generally a drum. The spot of the image forms a scan light after the laser beam is emitted from the light source, scanned oscillatory by the MEMS reflecting mirror, and reflected by the MEMS reflecting mirror. After the angle and position of the scan light are corrected by the two-element fθ lens of the invention, a spot may be formed on the drum. Since a photosensitive agent is coated onto the drum, data can be printed out on a piece of paper by the sensing carbon powder centralized on the paper.

The two-element fθ lens of the invention comprises a first lens and a second lens, counted from the MEMS reflecting mirror, wherein the first lens includes a first optical surface and a second optical surface, the second lens includes a third optical surface and a fourth optical surface. These optical surface provided the functions of correcting the phenomenon of non-uniform speed scanning which results in decreasing or increasing the distance between spots on an image surface of a MEMS reflecting mirror with a simple harmonic movement with time into a constant speed scanning, so that the projection of a laser beam onto an image side can give a constant speed scanning, and unify the deviation of image formed on the drum which caused by a scan light in the main scanning direction and the sub scanning direction deviated from the optical axis, so as to make the correction to focus the scan light at a target.

To make it easier for our examiner to understand the technical characteristics and effects of the present invention, we use preferred embodiments and related drawings for the detailed description of the present invention as follows.

DETAILED DESCRIPTION OF THE PREFERRED EMBODIMENTS

Figure 1:
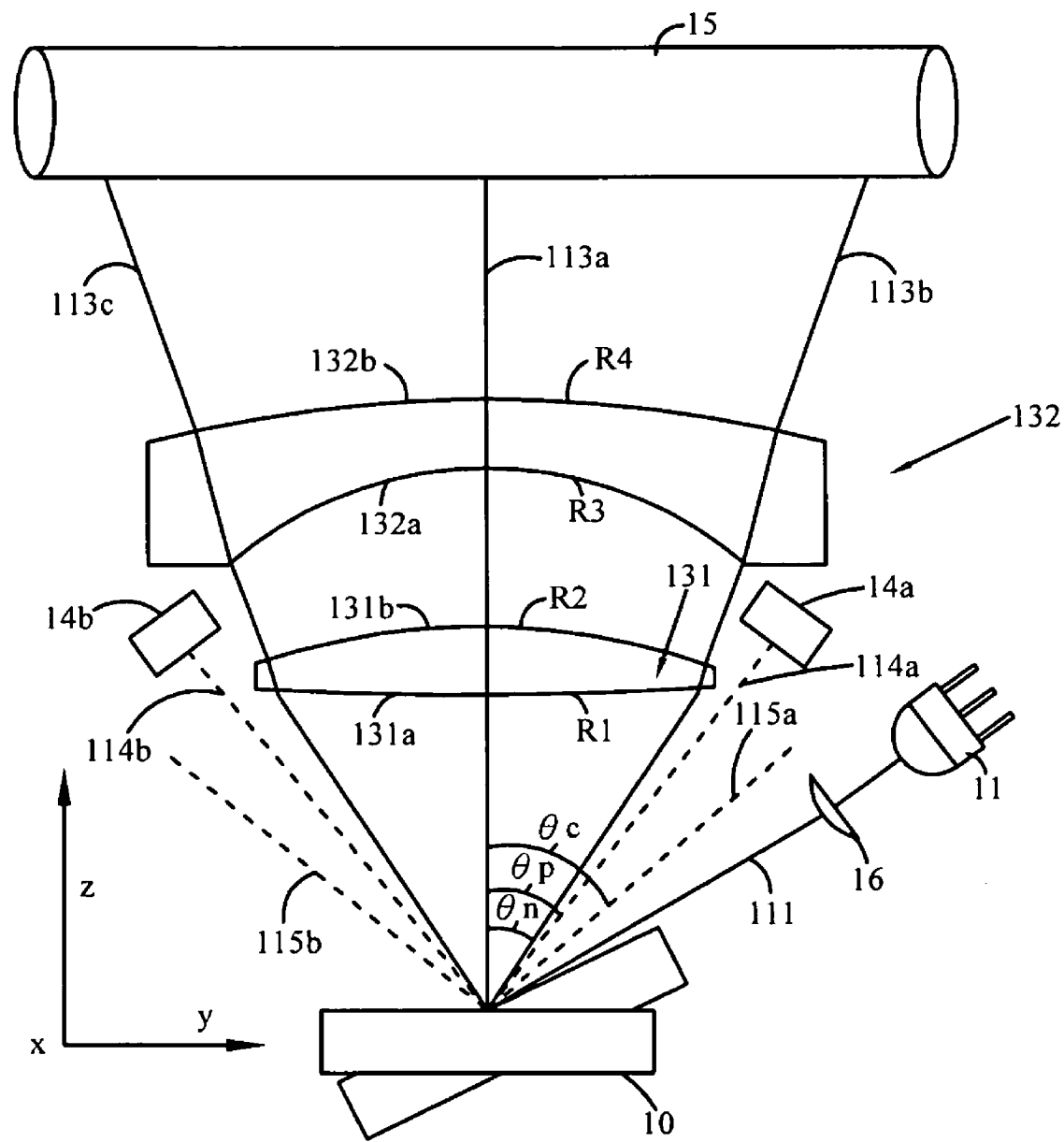
FIG. 1 shows optical paths of a two-element fθ lens of the present invention.

Referring to FIG. 1 for a schematic view of optical paths of a two-element fθ lens used for a micro-electro mechanical system (MEMS) laser unit in accordance with the present invention, the two-element fθ lens used for the micro-electro mechanical system (MEMS) laser scanning unit comprises: a first lens 131 having a first optical surface 131a and a second optical surface 131b, and a second lens having a third optical surface 132a and a fourth optical surface 132b. In FIG. 1, the MEMS laser scanning unit comprises a laser source 11, a MEMS reflecting mirror 10, a cylindrical lens 16, two photoelectric sensors 14a, 14b and a light sensing target. In FIG. 1 the target is implemented by a drum 15. After a beam 111 produced by the light laser source 11 is passed through a cylindrical lens 16, the beam 111 is projected onto the MEMS reflecting mirror 10. The MEMS reflecting mirror 10 generates a resonant oscillation to reflect the beam 111 into scan lights 113a, 113b, 114a, 114b, 115a, 115b at different time frames along the direction of Z, wherein the scan lights 113a, 113b, 114a, 114b, 115a, 115b are projected in a X direction which is called a sub scanning direction, and projected in a Y direction which is called a main scanning direction, and the maximum scanning angle of the MEMS reflecting mirror 10 is θc.

Figure 2:
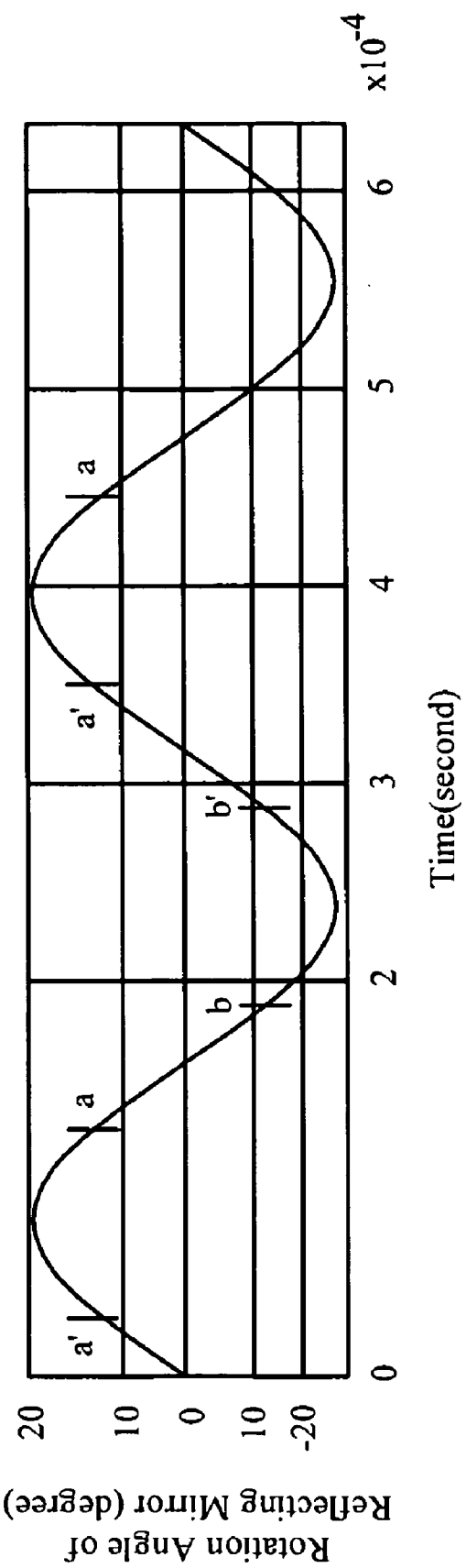
FIG. 2 shows a relation of scanning angle θ versus time t of the MEMS reflecting mirror.

Since the MEMS reflecting mirror 10 comes with a simple harmonic movement, and the angle of movement shows a sinusoidal change with time as shown in FIG. 2, therefore the angle and time of reflecting the scan light are in a non-linear relation. The swinging angle of the MEMS reflecting mirror 10 has a wave peak a-a' and a wave valley b-b' as shown in the figure, and its swinging angle is significantly smaller than the wave sections a-b an a'-b', and this non-uniform angular speed may cause an image deviation easily produced on the drum 15 by the scan light. Therefore, photoelectric sensors 14a, 14b are installed at the angle ±θp within the range below the maximum scanning angle ±θc of the MEMS reflecting mirror 10 and the laser beam 111 starts to be reflected by the MEMS reflecting mirror 10 at the wave peak as shown in FIG. 2, which is equivalent to the scan light 115a as shown in FIG. 1. If the photoelectric sensor 14a detects a scanned beam, it means that the MEMS reflecting mirror 10 swings to an angle of ±θp, which is equivalent to the scan light 114a as shown in FIG. 1. If the MEMS reflecting mirror 10 scans point "a" at an angle variation as shown in FIG. 2, such point is equivalent to the position of the scan light 113a. Now, the laser source 11 is controlled to start emitting the laser beam 111. When the point "b" as shown in FIG. 2 is scanned, such point is equivalent to the position of the scan light 113b (which is equivalent to the laser beam 111 emitted by the laser source 11a within an angle of ±θn). When the MEMS reflecting mirror 10 swings in an opposite direction to a wave section a'-b', the laser source 11 is controlled to start emitting the laser beam 111 to complete a cycle.

Figure 3:
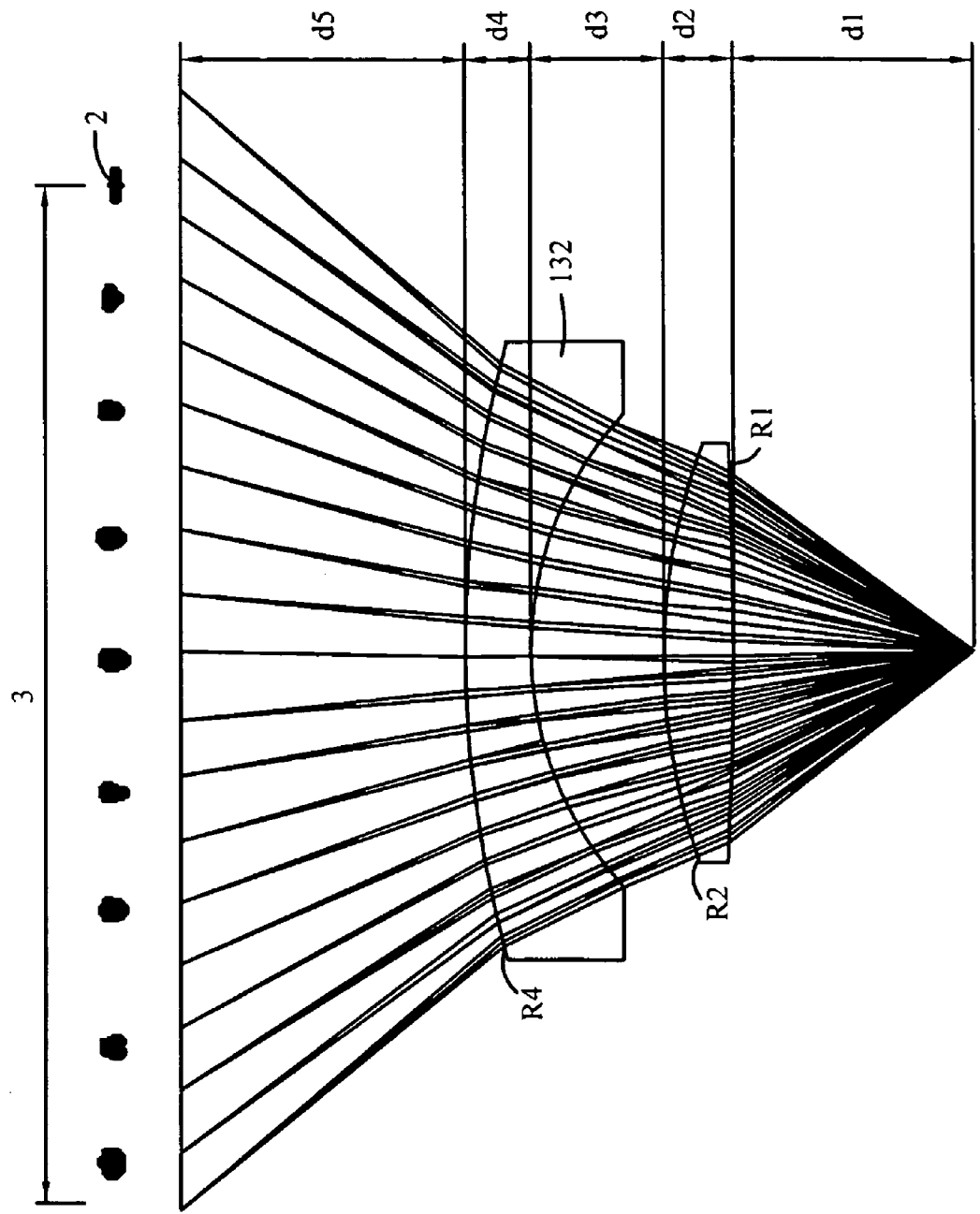
FIG. 3 shows an optical path chart and numerals of a scan light passing through a first lens and a second lens.

Referring to FIG. 3 for an optical path chart of a scan light passing through a first lens and a second lens, in which ±θn is a valid scanning angle. If the MEMS reflecting mirror 10 is swung to the angle of ±θn, the laser source 11 starts emitting the desired scanning laser beam 111 which is reflected into a scan light by the MEMS reflecting mirror 10, and the scan light is passed through the first lens 131 and refracted by the first optical surface and the second optical surface of the first lens 131, and the scan light reflected by the MEMS reflecting mirror 10 with a none-linear relation between distance and time is converted into a scan light with a linear relation between distance and time. After the scan light is passed through the first lens 131 and the second lens 132, the focusing effect of the first optical surface 131a, the second optical surface 131b, the third optical surface 132a and the fourth optical surface 132b of the first lens 131 and the second lens 132 and the interval of each optical surface can focus the scan light at the drum 15 and form a column of spots 2 on the drum 15, and the distance between the farthest two spots projected on the drum 15 is called an effective scanning windows 3, wherein along the optical axis Z, $d_1$ is the distance between the MEMS reflecting mirror 10 and the first optical surface, $d_2$ is the distance between the first optical surface and the second optical surface, $d_3$ is the distance between the second optical surface and the third optical surface, $d_4$ is the distance between the third optical surface and the fourth optical surface $R_4$, $d_5$ is the distance between the fourth optical surface and the drum, $R_1$ is the radius of curvature of the first optical surface, $R_2$ is the radius of curvature of the second optical surface, $R_3$ is the radius of curvature of the third optical surface, $R_4$ is the radius of curvature of the fourth optical surface in the optical axis.

Figure 4:
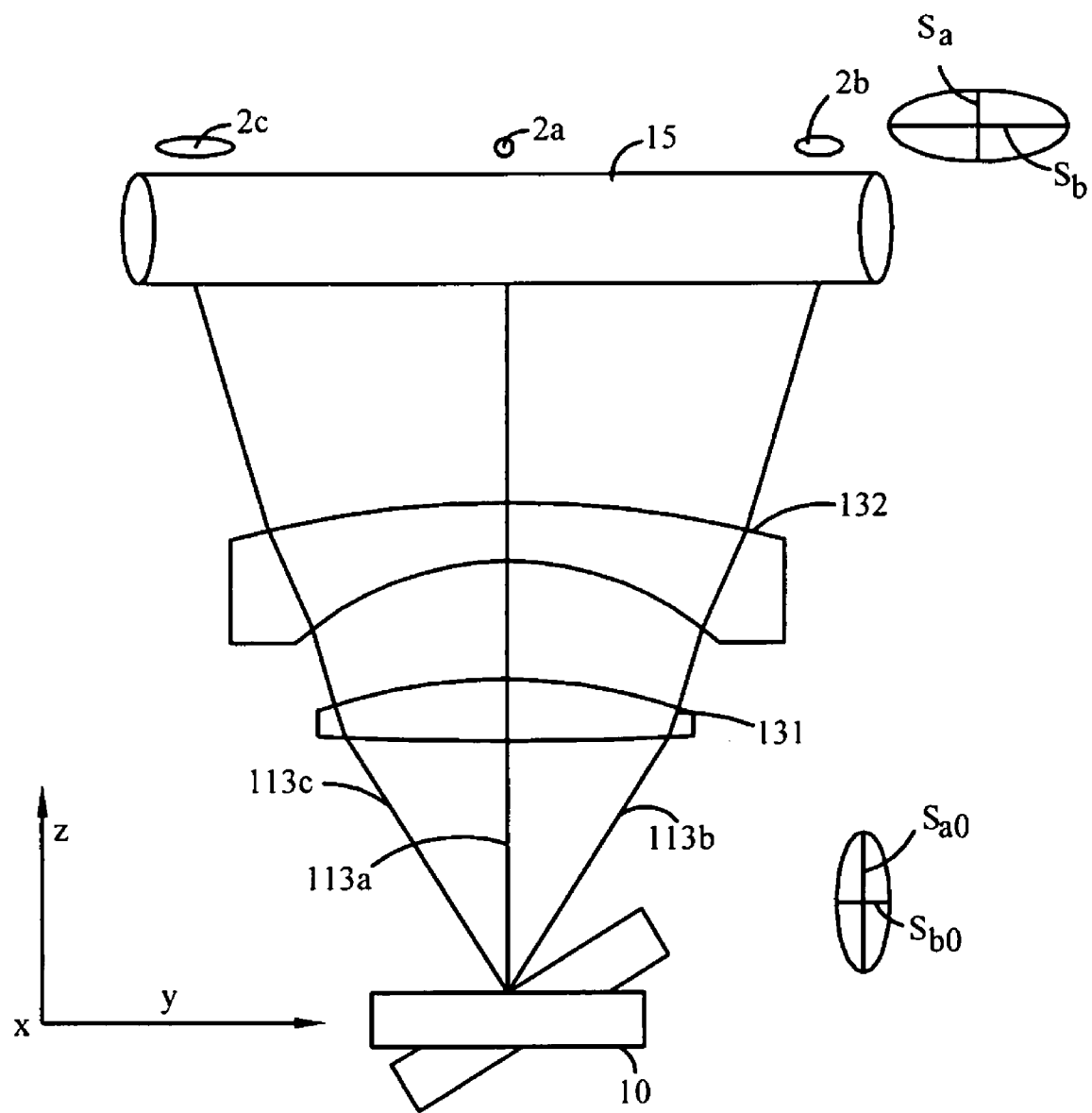
FIG. 4 shows a spot area varied with a different projecting position after a scan light is projected onto a drum.
Figure 5:
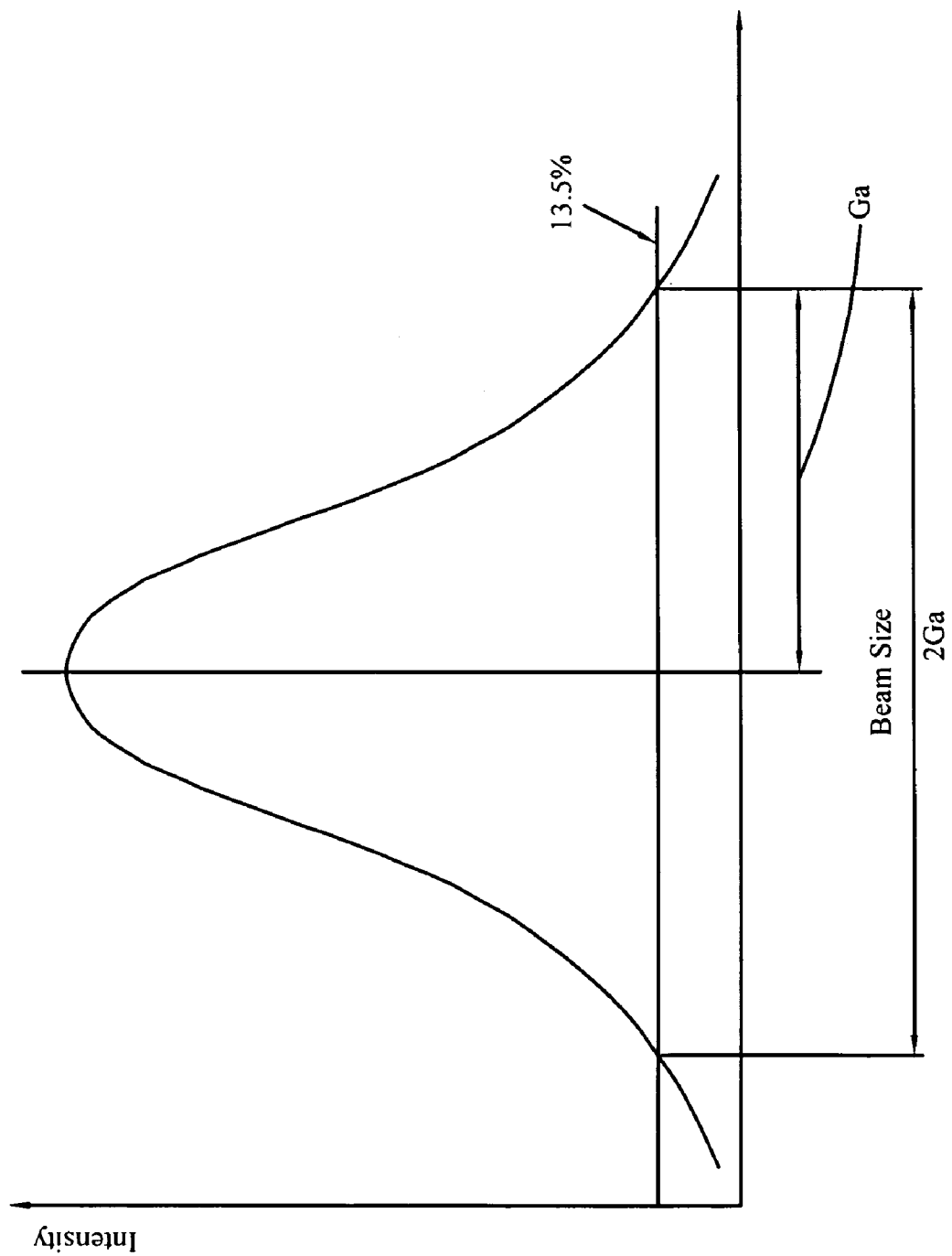
FIG. 5 shows the Y direction of Gaussian beam diameter of scanning light emitted by fθ lens.

Referring to FIG. 4 for a spot area varied with a different projecting position after a scan light is projected onto a drum, if the scan light 113a is projected in a direction along the optical axis Z and onto the drum 15 by the first lens 131 and the second lens 132, the incident angles of the first lens 131 and the second lens 132 are zero, and thus the deviation of the main scanning direction is minimum (said zero), and the image at the spot 2a on the drum 15 is in an inferenced circle-like shape (same shape as laser light beam). After the scan light 113b and 113c is projected on the drum 15 by the first lens 131 and the second lens 132, the incident angle of the first lens 131 and the second lens 132 with respect to the optical axis is non-zero, and the deviation of the main scanning direction is non-zero, and thus the projection distance of the main scanning direction is longer than the spot formed by the scan light 111a is also bigger. Not only has the phenomenon existed in the main scanning direction but also in the sub scanning direction. Therefore, the image at the spot 2b, 2c on the drum 15 is in an oval-like shape, and the area of 2b, 2c is greater than the area of 2a. Denoted $S_{a0}$ and $S_{b0}$ are the lengths of spots of the scan light in the main scanning direction (Y direction) and the sub scanning direction (X direction) on a reflecting surface of the MEMS reflecting mirror 10, and $G_{a0}$ and $G_{b0}$ are the Gaussian beam diameter of scanning light emitted by fθ lens 13 at the intensity is 13.5% of maximum intensity on Y direction and the X direction, illustrated by FIG. 5. In FIG. 5, only Y direction Gaussian beam is shown. The two-element fθ lens of the invention can control the spot size in the main scanning direction within a limited range by the distortion correction of the fθ lens 13 and correct the spot size in the sub scanning direction by the distortion correction of the first lens 131 and the second 132 of the two-element fθ lens 13, such that the spot size is controlled within a limited range, and the distribution of the spot size (or the ratio of largest spots and smallest spots) is controlled within an appropriate range in compliance with the required resolution.

To achieve the forgoing effects, the two-element fθ lens of the invention comes with a first lens having a first optical surface and a second optical lens having a third optical surface and a fourth optical surface of with a spherical surface or an aspherical surface. If the Aspherical surface is adopted, the aspherical surface is designed with the following equations (2) or (3)

1. Anamorphic Equation $$Z = \frac{(Cx)X^2 + (Cy)Y^2}{1 + \sqrt{1 - (1+Kx)(Cx)^2 X^2 - (1+Ky)(Cy)^2 Y^2}} + \quad (2)$$

$$A_R[(1-A_P)X^2 + (1+A_P)Y^2]^2 + B_R[(1-B_P)X^2 + (1+B_P)Y^2]^3 +$$

$$C_R[(1-C_P)X^2 + (1+C_P)Y^2]^4 + D_R[(1-D_P)X^2 + (1+D_P)Y^2]^5$$

where, Z is the sag of any point on the surface parallel to the Z-axis, $C_x$ and $C_y$ are curvatures in the X direction and the Y direction respectively, $K_x$ and $K_y$ are the conic coefficients in the X direction and the Y direction respectively and correspond to eccentric city in the same way as conic coefficient for the Aspherical surface type, $A_R$, $B_R$, $C_R$ and $D_R$ are deformations from the conic coefficient of rotationally symmetric portions of the fourth order, the sixth order, the eighth and the tenth order respectively, and $A_P$, $B_P$, $C_P$ and $D_P$ are deformation from the conic coefficient of non-rotationally symmetric components to the fourth order, the sixth order, the eight order and the tenth order respectively. This reduces to Aspherical surface type when $C_x=C_y$, $K_x=K_y$ and $A_P=B_P=C_P=D_P=0$.

2. Toric Equation $$Z = Zy + \frac{(Cxy)X^2}{1 + \sqrt{1 - (Cxy)^2 X^2}} \quad (3)$$

$$Cxy = \frac{1}{(1/Cx) - Zy}$$

$$Zy = \frac{(Cy)Y^2}{1 + \sqrt{1 - \frac{(1+Ky)}{(Cy)^2 Y^2}}} + B_4 Y^4 + B_6 Y^6 + B_8 Y^8 + B_{10} Y^{10}$$

where, Z is the sag of any point on the surface parallel to the Z-axis; $C_y$ and $C_x$ are curvatures in the X direction and the Y direction respectively, $K_y$ is a conic coefficient in the Y direction, $B_4$, $B_6$, $B_8$ and $B_{10}$ are deformations from the conic coefficient to the fourth, sixth, eight and tenth order respectively. When $C_x=C_y$ and $K_y=A_P=B_P=C_P=D_P=0$ is reduced to a single spherical surface.

To unify the scan speed of the scan light projected onto the image of the target, the invention adopts two equal time interval and an equal distance between two spots, and the two-element fθ lens of the invention can correct the emergence angle of the scan light between the scan light 113a to the scan light 113b, so that the first lens 131 and the second lens 132 corrects the emergence angle of the scan light to produce two scan lights at the same time interval. After the emergence angle is corrected, the distance between any two spots formed on the drum 15 of the image is equal. Further, after the laser beam 111 is reflected by the MEMS reflected mirror 10, the spot is diverged and becomes larger. After the scan light is passed through the distance from the MEMS reflecting mirror 10 to the drum 15, the spot becomes larger. Such arrangement is in compliance with the actual required resolution. The two-element fθ lens of the invention further focuses from the scan light 113a to the scan light 113b reflected by the MEMS reflecting mirror 10 at the drum 15 of the image to from a smaller spot in the main scanning and sub scanning directions. The two-element fθ lens of the invention further uniforms the spot size of the image on the drum 15 (to limit spot size in a range to comply with the required resolution) for the best condition.

The two-element fθ lens comprises a first lens 131 and a second lens 132, counted from the MEMS reflecting mirror 10, and the first lens is a biconvex lens, the second lens is a meniscus lens of which the concave surface is disposed on a side of a MEMS mirror, wherein the first lens 131 includes a first optical surface 131a and a second optical surface 131b for converting a scan spot with a non-linear relation between angle and time and reflected by the MEMS reflecting mirror 10 into a scan spot with a linear relation between distance and time; and the second lens 132 includes a third optical surface 132a and a fourth optical surface 132b for correcting the focus of the scan light of the first lens 131 onto target; such that the two-element fθ lens projects a scan light reflected by the MEMS reflecting mirror 10 onto the image of the drum 15. The first optical surface 131a, the second optical surface 131b, the third optical surface 132a and the fourth optical surface 132b are optical surfaces composed of at least one Aspherical surface in the main scanning direction. The first optical surface 131a and the second optical surface 131b are optical surfaces composed of at least one aspherical surface in the sub scanning direction. Further, the assembly of the first lens 131 and the second lens 132 of the two-element fθ lens in accordance with the present invention has an optical effect in the main scanning direction that satisfies the conditions of Equation (4) and (5):

$$0.1 < \frac{d_3 + d_4 + d_5}{f_{(1)Y}} < 0.6 \quad (4)$$

$$-0.4 < \frac{d_5}{f_{(2)Y}} < -0.02 \quad (5)$$

or, the main scanning direction satisfies the conditions of equation (6)

$$0.1 < \left| f_{sY} \cdot \left( \frac{(n_{d1} - 1)}{f_{(1)y}} + \frac{(n_{d2} - 1)}{f_{(2)y}} \right) \right| < 1.2 \quad (6)$$

and the sub scanning direction satisfies the conditions of equation (7)

$$0.086 < \left| \left( \frac{1}{R_{1x}} - \frac{1}{R_{2x}} \right) + \left( \frac{1}{R_{3x}} - \frac{1}{R_{4x}} \right) f_{sX} \right| < 1.0 \quad (7)$$

where, $f_{(1)Y}$ is the focal length of the first lens 131 in the main scanning direction, $f_{(2)Y}$ is the focal length of the second lens 132 in the main scanning direction, $d_3$ is the distance between an optical surface on a target side of the first lens 131 when θ=0° an optical surface on the MEMS reflecting mirror side of the second lens 132, $d_4$ is the thickness of the second lens when θ=0°, $d_5$ is the distance between an optical surface on a target side of the second lens 132 when θ=0° and the target, $f_{(1)X}$ is the focal length of the first lens in the sub scanning direction, $f_{(2)X}$ is the focal length of the second lens in the sub scanning direction, $f_s$ is the combined focal length of the two-element fθ lens, $R_{ix}$ is the radius of curvature of the i-th optical surface in the X direction; and $n_{d1}$ and $n_{d2}$ are the refraction indexes of the first lens and the second lens 13 respectively.

Further, the spot uniformity produced by the two-element fθ lens of the invention can be indicated by the ratio δ of the largest spot and the smallest spot size that satisfies the conditions of Equation (8):

$$0.4 < \delta = \frac{\min(S_b \cdot S_a)}{\max(S_b \cdot S_a)} \quad (8)$$

$$\eta_{max} = \frac{\max(S_b \cdot S_a)}{(S_{b0} \cdot S_{a0})} < 0.10 \quad (9)$$

$$\eta_{min} = \frac{\min(S_b \cdot S_a)}{(S_{b0} \cdot S_{a0})} < 0.10 \quad (10)$$

where, $S_a$ and $S_b$ are the lengths of any one spot of the scan light formed on the drum in the main scanning direction and the sub scanning direction, δ is the ratio of the smallest spot and the largest spot on the drum 15, $S_{a0}$ and $S_{b0}$ are the lengths of the spots of the scan light on the reflecting surface of the MEMS reflecting mirror 10 in the main scanning direction and the sub scanning direction respectively.

To make it easier for our examiner to understand the structure and technical characteristics of the present invention, we use the preferred embodiments accompanied with related drawings for the detailed description of the present invention as follows.

The following preferred embodiments of the invention disclose a two-element fθ lens used for a micro-electro mechanical system (MEMS) laser scanning unit by using major elements for the illustration, and thus the preferred embodiments can be applied in a MEMS laser scanning unit including but not limited to the two-element fθ lens with components illustrated in the embodiments only, but any other equivalents are intended to be covered in the scope of the present invention. In other words, any variation and modification of the two-element fθ lens used for a micro-electro mechanical system (MEMS) laser scanning unit can be made by the persons skilled in the art. For example, the radius of curvature of the first lens and the second lens, the design of the shape, the selected material and the distance can be adjusted without any particular limitation.

Figure 7:
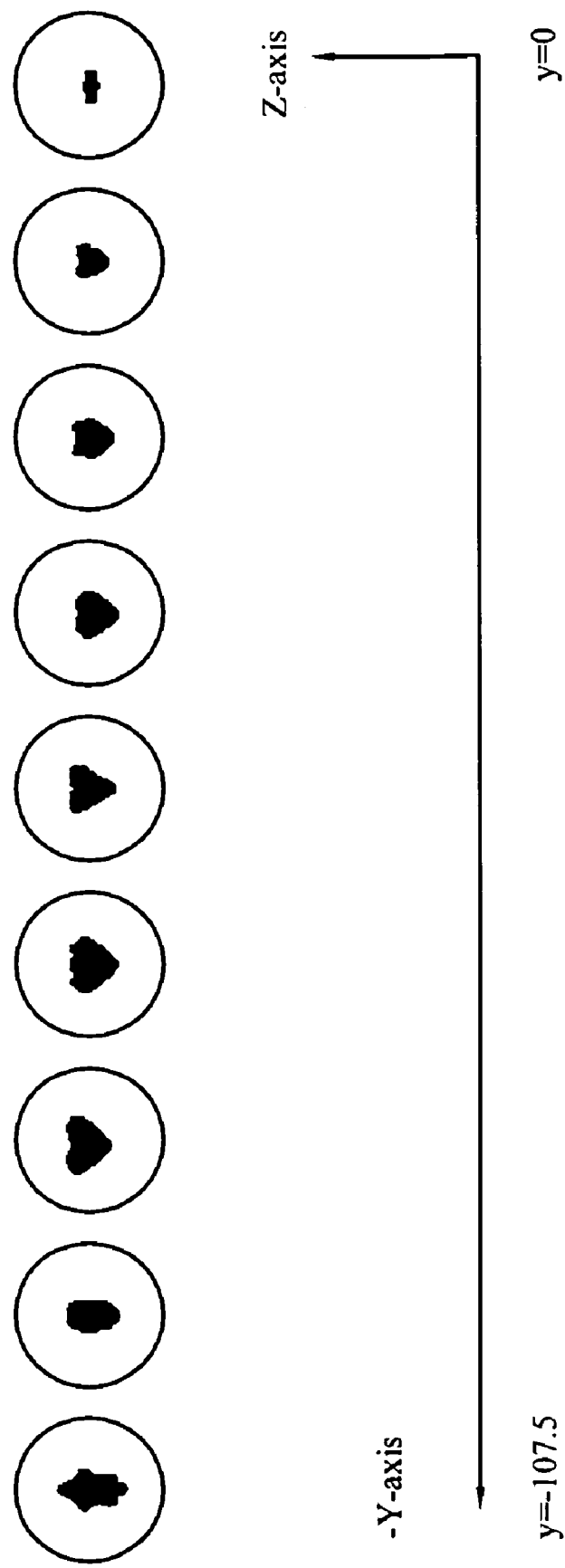
FIG. 7 shows spots in accordance with a first preferred embodiment of the present invention.

In a first preferred embodiment, the two-element fθ lens comprises a first lens and a second lens. The first lens is a biconvex lens, the second lens is a meniscus lens of which the concave surface is disposed on a side of a MEMS mirror, and a first optical surface and a second optical surface of the first lens, and a third optical surface and a fourth optical surface of the second lens are all Aspherical surfaces designed in accordance with the Equation (2), and the optical characteristics and the Aspherical surface parameters are listed in Tables 1 and 2.

distance and time, and the spots with spot 3 $S_{a0}$=14.19 and $S_{b0}$=3109.99 (μm) on the MEMS reflecting mirror 10 are scanned into scan lights and focused on the drum 15 to form a smaller spot 6 and satisfy the conditions of Equations (4) to (10) as listed in Table 3. The maximum diameter (μm) of geometric spot on the drum at distance Y (mm) from the center point along the drum surface is shown in Table 4. The distribution of spot sizes from the central axis to the left side of the scan window 3 is outlined as FIG. 7, where the diameter of unity circle is 0.05 mm.

TABLE 1

Optical Characteristics of fθ lens for First Preferred Embodiment

| optical surface | radius (mm) | d, thickness | nd, refraction index |
|---|---|---|---|
| MEMS Reflection | | | |
| R0 | ∞ | 15.00 | 1 |
| lens 1 | | | 1.533 |
| R1 (Anamorphic) | | | |
| R1x* | −59.360 | 8.00 | |
| R1y* | 412.450 | | |
| R2 (Anamorphic) | | | |
| R2x* | −13.829 | 15.00 | |
| R2y* | −191.013 | | |
| lens 2 | | | 1.533 |
| R3 (Anamorphic) | | | |
| R3x* | 44.642 | 8.00 | |
| R3y* | −67.421 | | |
| R4 (Anamorphic) | | | |
| R4x* | 79.167 | 35.90 | |
| R4y* | −140.146 | | |
| drum R5 | ∞ | 0.00 | |

*Aspherical surface

TABLE 3

| Conditions for first Preferred Embodiment | |
|---|---|
| $\dfrac{d_3 + d_4 + d_5}{f_{(1)Y}}$ | 0.2368 |
| $\dfrac{d_5}{f_{(2)Y}}$ | −0.1401 |
| Main scanning direction $\left\| f_{sY} \cdot \left( \dfrac{(n_{d1}-1)}{f_{(1)y}} + \dfrac{(n_{d2}-1)}{f_{(2)y}} \right) \right\|$ | 0.4105 |
| Sub scanning direction $\left\| \left( \dfrac{1}{R_{1x}} - \dfrac{1}{R_{2x}} \right) + \left( \dfrac{1}{R_{3x}} - \dfrac{1}{R_{4x}} \right) f_{sX} \right\|$ | 0.3319 |
| $\delta = \dfrac{\min(S_b \cdot S_a)}{\max(S_b \cdot S_a)}$ | 0.4261 |
| $\eta_{max} = \dfrac{\max(S_b \cdot S_a)}{(S_{b0} \cdot S_{a0})}$ | 0.0732 |
| $\eta_{min} = \dfrac{\min(S_b \cdot S_a)}{(S_{b0} \cdot S_{a0})}$ | 0.0312 |

TABLE 2

Parameters of Aspherical Surface of Optical Surface Parameter for First Preferred Embodiment

| | Anamorphic equation Coefficient | | | | |
|---|---|---|---|---|---|
| optical surface | Ky, Conic Coefficient | 4th Order Coefficient (AR) | 6th Order Coefficient (BR) | 8th Order Coefficient (CR) | 10th Order Coefficient (DR) |
| R1* | −9.9999E+00 | −2.9306E−07 | 6.6452E−08 | 0.0000E+00 | 0.0000E+00 |
| R2* | 2.0503E+01 | −9.9853E−08 | −4.9315E−10 | 0.0000E+00 | 0.0000E+00 |
| R3* | −1.0279E+00 | −9.5331E−08 | 7.4517E−11 | 0.0000E+00 | 0.0000E+00 |
| R4* | 4.2555E+00 | −3.8792E−06 | 6.3532E−10 | 0.0000E+00 | 0.0000E+00 |
| | Kx, Conic Coefficient | 4th Order Coefficient (AP) | 6th Order Coefficient (BP) | 8th Order Coefficient (CP) | 10th Order Coefficient (DP) |
| R1* | −3.7713E+01 | 7.5767E−01 | −1.0434E+00 | 0.0000E+00 | 0.0000E+00 |
| R2* | −9.6614E−01 | 2.8051E−01 | 0.0000E+00 | 0.0000E+00 | 0.0000E+00 |
| R3* | 6.0316E+00 | 3.1716E+00 | 0.0000E+00 | 0.0000E+00 | 0.0000E+00 |
| R4* | 2.5689E+01 | −1.4215E+00 | −1.2072E−01 | 0.0000E+00 | 0.0000E+00 |

Figure 6:
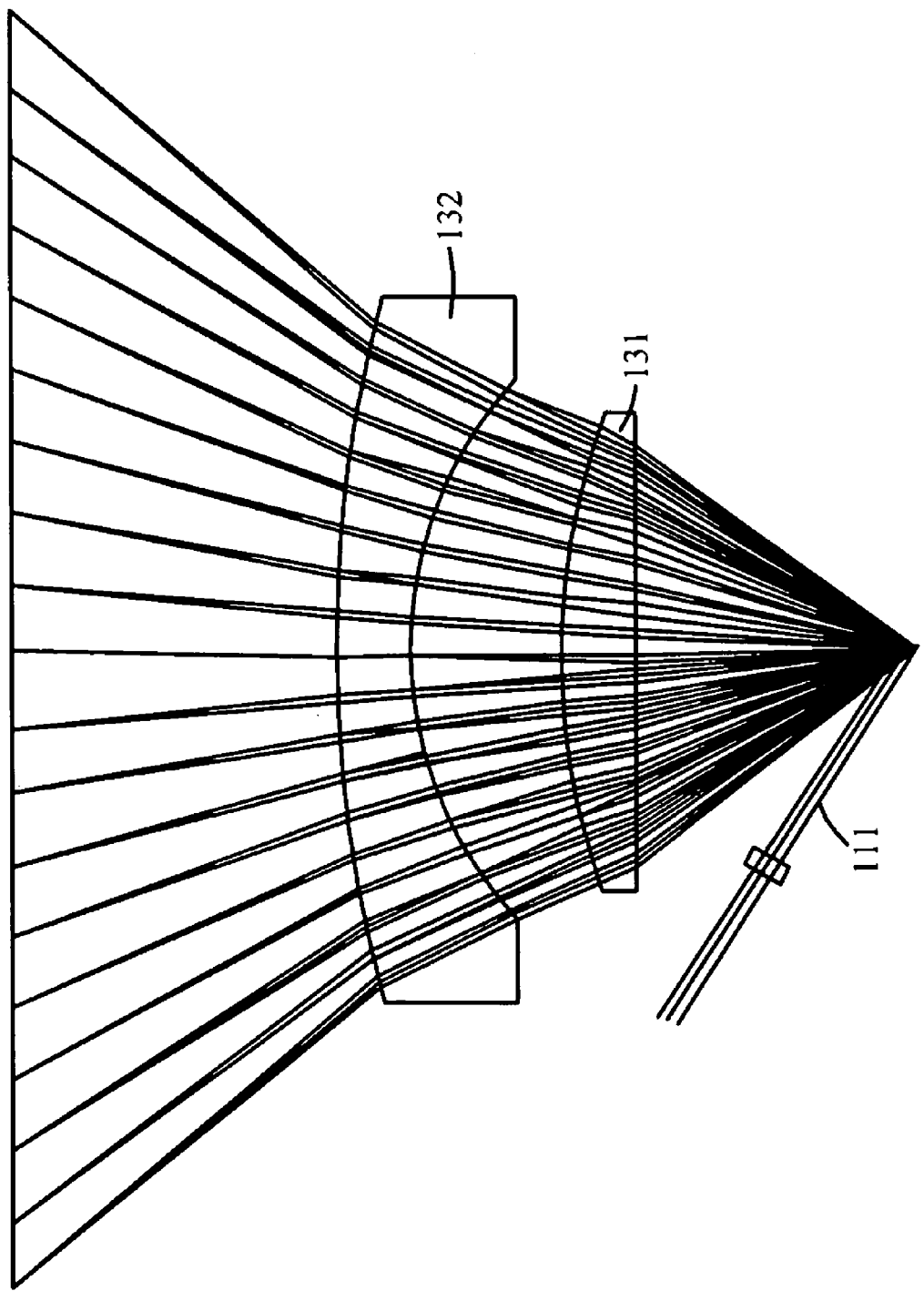
FIG. 6 shows an optical path chart of a scan light passing through a first lens and a second lens.

Referring to FIG. 6 for the optical path chart of an optical surface of the two-element fθ lens 13, $f_{(1)Y}$=248.747, $f_{(2)Y}$=−256.151, $fs_X$=28.301, $fs_Y$=3349.652 (mm), so that the scan light can be converted into a scan spot with a linear relation of

TABLE 4

The maximum diameter (μm) of light spot on the drum

| | Y | | | | | | | | |
|---|---|---|---|---|---|---|---|---|---|
| | −107.464 | −96.075 | −84.350 | −72.401 | −60.337 | −48.240 | −36.152 | −24.085 | 0.000 |
| Max diameter | 1.95E−02 | 1.38E−02 | 1.62E−02 | 1.61E−02 | 1.41E−02 | 1.27E−02 | 1.10E−02 | 9.01E−03 | 8.76E−03 |

In a second preferred embodiment, the two-element fθ lens comprises a first lens and a second lens. The first lens is a biconvex lens, the second lens is a meniscus lens of which the concave surface is disposed on a side of a MEMS mirror, and a first optical surface and a second optical surface of the first lens, and a third optical surface and a fourth optical surface of the second lens are all Aspherical surface designed in accordance with the Equation (2), and the optical characteristics and the Aspherical surface parameters are listed in Tables 5 and 6.

TABLE 5

Optical characteristics of fθ lens for Second Preferred Embodiment

| optical surface | radius (mm) | d, thickness | nd, refraction index |
|---|---|---|---|
| MEMS Reflection | | | |
| R0 | ∞ | 41.10 | 1 |
| lens 1 | | | 1.533 |
| R1 (Anamorphic) | | | |
| R1x* | −58.925 | 11.06 | |
| R1y* | 500.000 | | |
| R2 (Anamorphic) | | | |
| R2x* | −14.250 | 22.54 | |
| R2y* | −131.984 | | |
| lens 2 | | | 1.533 |
| R3 (Anamorphic) | | | |
| R3x* | 41.947 | 11.34 | |
| R3y* | −68.377 | | |
| R4 (Anamorphic) | | | |
| R4x* | 44.939 | 59.54 | |
| R4y* | −193.191 | | |
| drum R5 | ∞ | 0.00 | |

*Aspherical surface

TABLE 6

Parameters of Aspherical Surface of Optical Surface Parameter for Second Preferred Embodiment

| | Anamorphic equation Coefficient | | | | |
|---|---|---|---|---|---|
| optical surface | Ky, Conic Coefficient | 4th Order Coefficient (AR) | 6th Order Coefficient (BR) | 8th Order Coefficient (CR) | 10th Order Coefficient (DR) |
| R1* | −1.0000E+01 | −1.5664E−07 | −2.4611E−08 | 0.0000E+00 | 0.0000E+00 |
| R2* | 4.1220E+00 | 1.7671E−07 | −1.0738E−10 | 0.0000E+00 | 0.0000E+00 |
| R3* | −6.5523E−01 | −5.4141E−07 | −1.1074E−10 | 0.0000E+00 | 0.0000E+00 |
| R4* | −2.1519E+01 | −7.5590E−07 | 2.4110E−11 | 0.0000E+00 | 0.0000E+00 |
| | Kx, Conic Coefficient | 4th Order Coefficient (AP) | 6th Order Coefficient (BP) | 8th Order Coefficient (CP) | 10th Order Coefficient (DP) |
| R1* | 9.0863E+00 | −2.0046E−01 | −1.0375E+00 | 0.0000E+00 | 0.0000E+00 |
| R2* | −7.3631E−01 | −2.3614E+00 | 0.0000E+00 | 0.0000E+00 | 0.0000E+00 |
| R3* | 9.9824E+00 | −7.5108E−01 | 0.0000E+00 | 0.0000E+00 | 0.0000E+00 |
| R4* | 3.7629E+00 | −5.0883E−01 | 2.5704E−01 | 0.0000E+00 | 0.0000E+00 |

Figure 8:
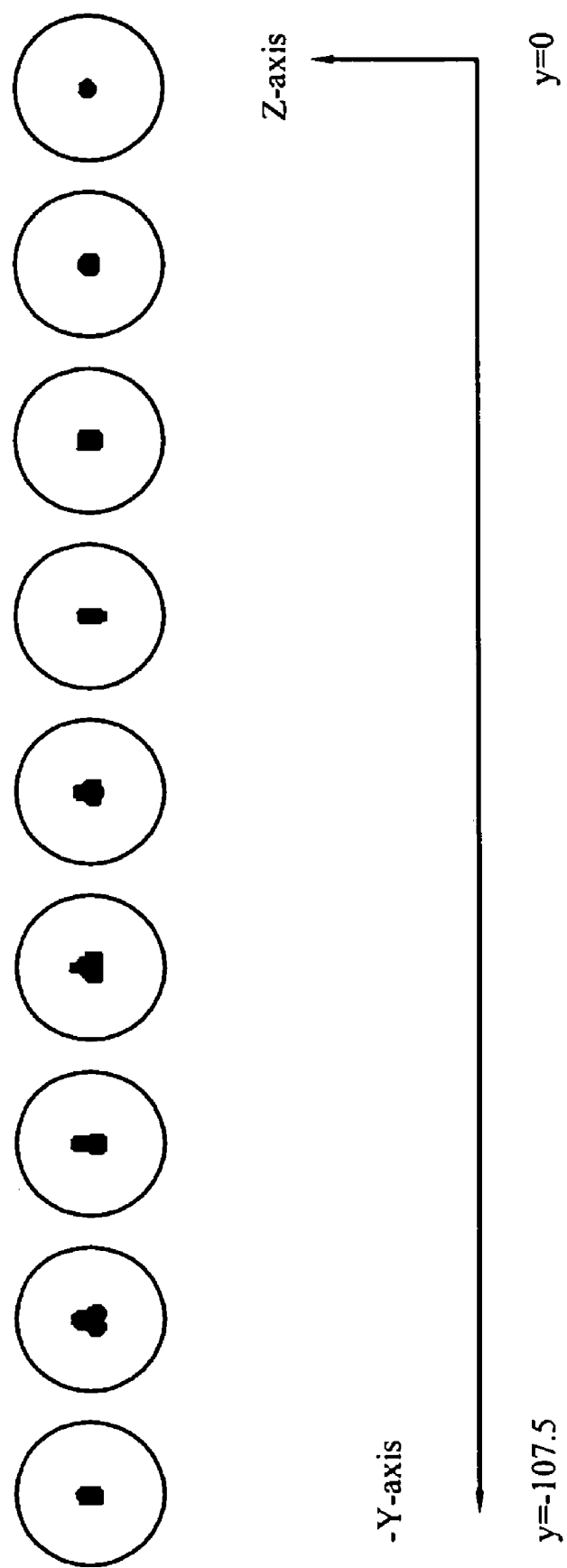
FIG. 8 shows spots in accordance with a second preferred embodiment of the present invention.

Referring to FIG. 6 for the optical path chart of an optical surface of the two-element fθ lens 13, $f_{(1)Y}$=199.250, $f_{(2)Y}$=−207.231, $fs_X$=29.556, $fs_Y$=1482.761 (mm), so that the scan light can be converted into a scan spot with a linear relation of distance and time, and the spots with spot 3 $S_{a0}$=14.19 and $S_{b0}$=3109.99 (μm) on the MEMS reflecting mirror 10 are scanned into scan lights and focused on the drum 15 to form a smaller spot 6 and satisfy the conditions of Equations (4) to (10) as listed in Table 7. The maximum diameter (μm) of geometric spot on the drum at distance Y (mm) from the center point along the drum surface is shown in Table 8. The distribution of spot sizes from the central axis to the left side of the scan window 3 is outlined as FIG. 8, where the diameter of unity circle is 0.05 mm.

In a third preferred embodiment, the two-element fθ lens comprises a first lens and a second lens. The first lens is a biconvex lens, the second lens is a meniscus lens of which the concave surface is disposed on a side of a MEMS mirror, and a first optical surface of the first lens and a fourth optical surface of the second lens are both Aspherical surfaces designed in accordance with the Equation (3), and a second optical surface of the first lens and a third optical surface of the second lens are both Aspherical surfaces designed in accordance with the Equation (2), and the optical characteristics and the Aspherical surface parameters are listed in Tables 9 and 10.

TABLE 7

Conditions for Second Preferred Embodiment

| | |
|---|---|
| $\dfrac{d_3 + d_4 + d_5}{f_{(1)Y}}$ | 0.4689 |
| $\dfrac{d_5}{f_{(2)Y}}$ | −0.2873 |
| Main scanning direction $\left\| f_{sY} \cdot \left( \dfrac{(n_{d1}-1)}{f_{(1)y}} + \dfrac{(n_{d2}-1)}{f_{(2)y}} \right) \right\|$ | 0.1528 |
| Sub scanning direction $\left\| \left( \dfrac{1}{R_{1x}} - \dfrac{1}{R_{2x}} \right) + \left( \dfrac{1}{R_{3x}} - \dfrac{1}{R_{4x}} \right) f_{sX} \right\|$ | 0.1101 |
| $\delta = \dfrac{\min(S_b \cdot S_a)}{\max(S_b \cdot S_a)}$ | 0.4150 |
| $\eta_{max} = \dfrac{\max(S_b \cdot S_a)}{(S_{b0} \cdot S_{a0})}$ | 0.0579 |
| $\eta_{min} = \dfrac{\min(S_b \cdot S_a)}{(S_{b0} \cdot S_{a0})}$ | 0.0238 |

TABLE 9

Optical Characteristics of fθ Lens for Third Preferred Embodiment

| optical surface | radius (mm) | d, thickness | nd, refraction index |
|---|---|---|---|
| MEMS Reflection | | | |
| R0 | ∞ | 35.00 | 1 |
| lens 1 | | | 1.533 |
| R1 (Y Toroid) | | | |
| R1x | −36.013 | 8.00 | |
| R1y* | 358.668 | | |
| R2 (Anamorphic) | | | |
| R2x* | −11.955 | 15.00 | |
| R2y* | −181.178 | | |
| lens 2 | | | 1.533 |
| R3 (Anamorphic) | | | |
| R3x* | 49.113 | 8.00 | |
| R3y* | −88.103 | | |
| R4 (Y Toroid) | | | |
| R4x | 68.272 | 37.94 | |
| R4y* | −91.937 | | |
| drum R5 | ∞ | 0.00 | |

*Aspherical surface

TABLE 8

The maximum diameter (μm) of geometric spot on the drum

| | Y | | | | | | | |
|---|---|---|---|---|---|---|---|---|
| | −107.460 | −95.920 | −84.089 | −72.091 | −60.022 | −47.949 | −35.905 | −23.903 | 0.000 |
| Max diameter | 5.12E−03 | 8.48E−03 | 7.56E−03 | 9.83E−03 | 7.57E−03 | 5.86E−03 | 5.06E−03 | 4.05E−03 | 2.40E−03 |

TABLE 10

Parameters of Aspherical Surface for Third Preferred Embodiment

| | Toric equation Coefficient | | | | |
|---|---|---|---|---|---|
| optical surface | Ky, Conic Coefficient | 4th Order Coefficient (B4) | 6th Order Coefficient (B6) | 8th Order Coefficient (B8) | 10th Order Coefficient (B10) |
| R1* | −3.8493E+02 | −9.3615E−07 | −1.7154E−10 | 0.0000E+00 | 0.0000E+00 |
| R4* | −9.1937E+01 | −1.1043E−07 | 3.7377E−11 | 0.0000E+00 | 0.0000E+00 |

TABLE 10-continued

Parameters of Aspherical Surface for Third Preferred Embodiment

Anamorphic equation Coefficient

| optical surface | Ky, Conic Coefficient | 4th Order Coefficient (AR) | 6th Order Coefficient (BR) | 8th Order Coefficient (CR) | 10th Order Coefficient (DR) |
|---|---|---|---|---|---|
| R2* | −6.1828E+00 | −3.3262E−08 | −1.4185E−10 | 0.0000E+00 | 0.0000E+00 |
| R3* | −2.0464E+00 | 5.4912E−08 | 1.2009E−10 | 0.0000E+00 | 0.0000E+00 |

| | Kx, Conic Coefficient | 4th Order Coefficient (AP) | 6th Order Coefficient (BP) | 8th Order Coefficient (CP) | 10th Order Coefficient (DP) |
|---|---|---|---|---|---|
| R2* | −6.3742E−01 | 1.3726E+00 | 0.0000E+00 | 0.0000E+00 | 0.0000E+00 |
| R3* | 1.0000E+01 | 9.2103E−01 | 0.0000E+00 | 0.0000E+00 | 0.0000E+00 |

Figure 9:
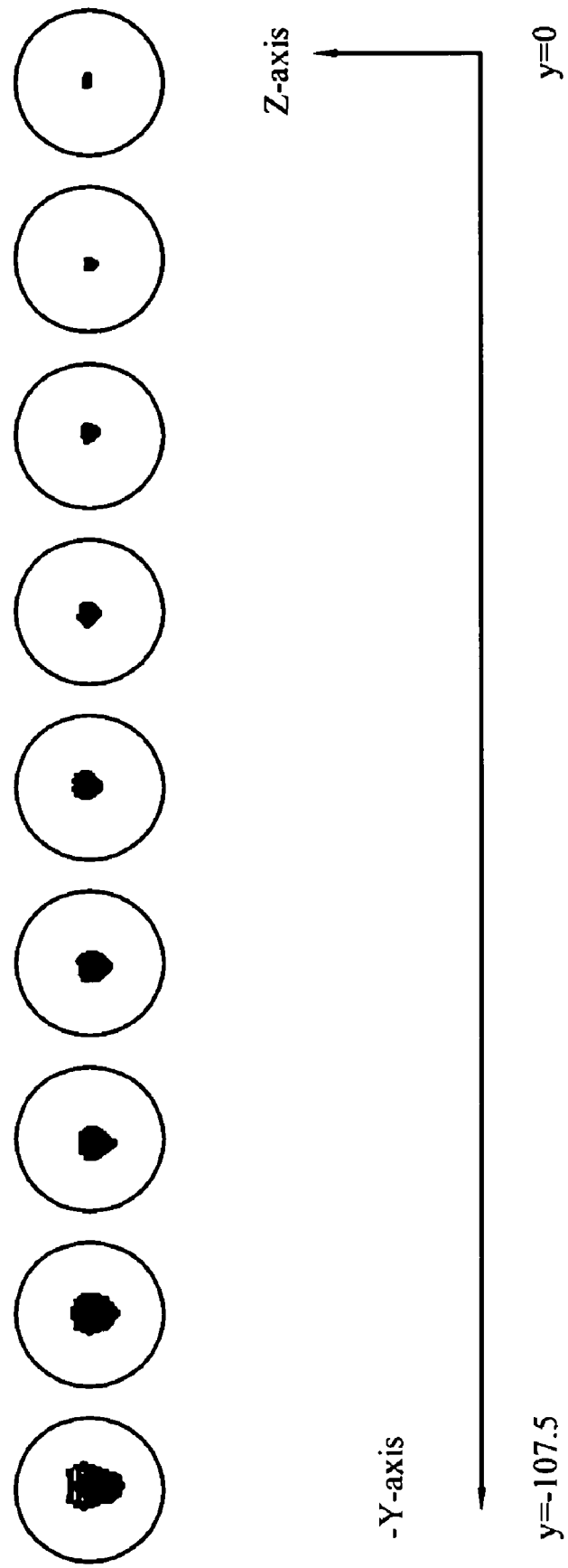
FIG. 9 shows spots in accordance with a third preferred embodiment of the present invention.

Referring to FIG. 6 for the optical path chart of an optical surface of the two-element fθ lens 13, $f_{(1)Y}$=29.477, $f_{(2)Y}$=−197.425, $fs_X$=27.634, $fs_Y$=−2795.472 (mm), so that the scan light can be converted into a scan spot with a linear relation of distance and time, and the spots with spot 3 $S_{a0}$=14.19 and $S_{b0}$=3109.99 (μm) on the MEMS reflecting mirror 10 are scanned into scan lights and focused on the drum 15 to form a smaller spot 6 and satisfy the conditions of Equations (4) to (10) as listed in Table 11. The maximum diameter (μm) of geometric spot on the drum at distance Y (mm) from the center point along the drum surface is shown in Table 12. The distribution of spot sizes from the central axis to the left side of the scan window 3 is outlined as FIG. 9, where the diameter of unity circle is 0.05 mm.

TABLE 11

Conditions for Third Preferred Embodiment

| | |
|---|---|
| $\dfrac{d_3 + d_4 + d_5}{f_{(1)Y}}$ | 0.2655 |
| $\dfrac{d_5}{f_{(2)Y}}$ | −0.1922 |
| Main scanning direction $\left\| f_{sY} \cdot \left( \dfrac{(n_{d1} - 1)}{f_{(1)y}} + \dfrac{(n_{d2} - 1)}{f_{(2)y}} \right) \right\|$ | 1.0546 |
| Sub scanning direction $\left\| \left( \dfrac{1}{R_{1x}} - \dfrac{1}{R_{2x}} \right) + \left( \dfrac{1}{R_{3x}} - \dfrac{1}{R_{4x}} \right) f_{sX} \right\|$ | 0.2138 |
| $\delta = \dfrac{\min(S_b \cdot S_a)}{\max(S_b \cdot S_a)}$ | 0.4240 |
| $\eta_{max} = \dfrac{\max(S_b \cdot S_a)}{(S_{b0} \cdot S_{a0})}$ | 0.0711 |

TABLE 11-continued

Conditions for Third Preferred Embodiment

| | |
|---|---|
| $\eta_{min} = \dfrac{\min(S_b \cdot S_a)}{(S_{b0} \cdot S_{a0})}$ | 0.0301 |

TABLE 12

The maximum diameter (μm) of geometric spot on the drum

| | Y | | | | | | | | |
|---|---|---|---|---|---|---|---|---|---|
| | −107.460 | −96.198 | −84.420 | −72.403 | −60.285 | −48.145 | −36.030 | −23.970 | 0.000 |
| Max diameter | 7.29E−02 | 5.56E−02 | 4.40E−02 | 3.76E−02 | 3.05E−02 | 2.51E−02 | 1.87E−02 | 1.29E−02 | 1.16E−02 |

In a fourth preferred embodiment, the two-element fθ lens comprises a first lens and a second lens. The first lens is a biconvex lens, the second lens is a meniscus lens of which the concave surface is disposed on a side of a MEMS mirror, and a first optical surface and a second optical surface of the first lens, and a third optical surface and a fourth optical surface of the second lens are all Aspherical surfaces designed in accordance with the Equation (2), and the optical characteristics and the Aspherical surface parameters are listed in Tables 13 and 14.

TABLE 13

Optical Characteristics of fθ lens for Fourth Preferred Embodiment

| optical surface | radius (mm) | d, thickness | nd, refraction index |
|---|---|---|---|
| MEMS Reflection | | | |
| R0 | ∞ | 9.47 | 1 |
| lens 1 | | | 1.533 |
| R1 (Anamorphic) | | | |
| R1x* | −61.108 | 9.47 | |
| R1y* | 1000.000 | | |
| R2 (Anamorphic) | | | |
| R2x* | −13.729 | 15.00 | |
| R2y* | −111.479 | | |
| lens 2 | | | 1.533 |

TABLE 13-continued

Optical Characteristics of fθ lens for Fourth Preferred Embodiment

| optical surface | radius (mm) | d, thickness | nd, refraction index |
|---|---|---|---|
| R3 (Anamorphic) | | | |
| R3x* | 43.145 | 8.00 | |
| R3y* | −72.636 | | |
| R4 (Anamorphic) | | | |
| R4x* | 54.966 | 39.56 | |
| R4y* | −186.128 | | |
| drum R5 | ∞ | 0.00 | |

*Aspherical surface

TABLE 14

Parameters of Aspherical Surface of Optical Surface for Fourth Preferred Embodiment Anamorphic equation Coefficient

| optical surface | Ky, Conic Coefficient | 4th Order Coefficient (AR) | 6th Order Coefficient (BR) | 8th Order Coefficient (CR) | 10th Order Coefficient (DR) |
|---|---|---|---|---|---|
| R1* | −1.0000E+01 | −2.4740E−07 | −1.1730E−08 | 0.0000E+00 | 0.0000E+00 |
| R2* | 3.8144E+00 | 1.8217E−07 | −1.3336E−10 | 0.0000E+00 | 0.0000E+00 |
| R3* | −5.4525E−01 | −1.3836E−07 | −1.0391E−10 | 0.0000E+00 | 0.0000E+00 |
| R4* | −1.7819E+01 | −2.2821E−07 | 3.4574E−11 | 0.0000E+00 | 0.0000E+00 |

| | Kx, Conic Coefficient | 4th Order Coefficient (AP) | 6th Order Coefficient (BP) | 8th Order Coefficient (CP) | 10th Order Coefficient (DP) |
|---|---|---|---|---|---|
| R1* | 1.406035 | −0.112245 | −1.041759 | 0.000000 | 0.000000 |
| R2* | −6.7830E−01 | −2.3380E+00 | 0.0000E+00 | 0.0000E+00 | 0.0000E+00 |
| R3* | 1.0000E+01 | −7.2372E−03 | 0.0000E+00 | 0.0000E+00 | 0.0000E+00 |
| R4* | −3.8113E+00 | −5.0027E−01 | 1.8215E−01 | 0.0000E+00 | 0.0000E+00 |

Figure 10:
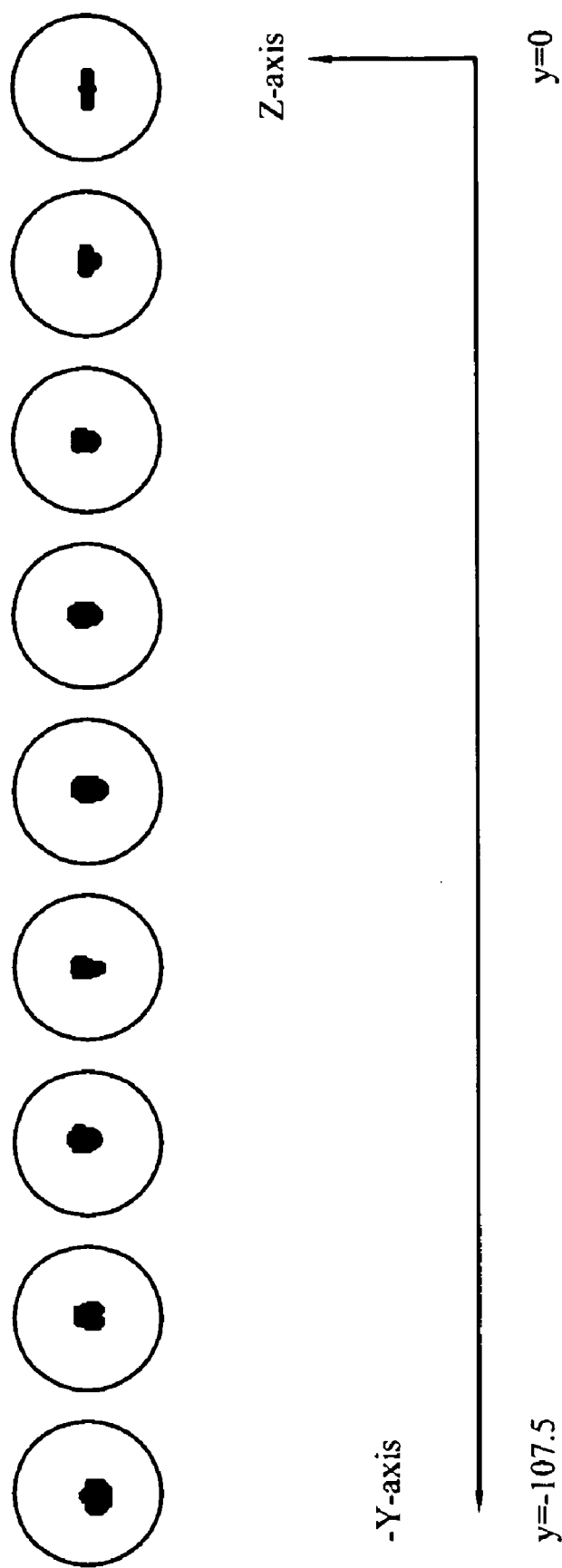
FIG. 10 shows spots in accordance with a fourth preferred embodiment of the present invention.

Referring to FIG. 6 for the optical path chart of an optical surface of the two-element fθ lens 13, $f_{(1)Y}$=190.790, $f_{(2)Y}$=−231.568, $fs_X$=28.33, $fs_Y$=834.13 (mm), so that the scan light can be converted into a scan spot with a linear relation of distance and time, and the spots with spot 3 $S_{a0}$=14.19 and $S_{b0}$=3109.99 (μm) on the MEMS reflecting mirror 10 are scanned into scan lights and focused on the drum 15 to form a smaller spot 6 and satisfy the conditions of Equations (4) to (10) as listed in Table 15. The maximum diameter (μm) of geometric spot on the drum at distance Y (mm) from the center point along the drum surface is shown in Table 16. The distribution of spot sizes from the central axis to the left side of the scan window 3 is outlined as FIG. 10, where the diameter of unity circle is 0.05 mm.

TABLE 15

Conditions for Fourth Preferred Embodiment

| | |
|---|---|
| $\dfrac{d_3 + d_4 + d_5}{f_{(1)Y}}$ | 0.3279 |
| $\dfrac{d_5}{f_{(2)Y}}$ | −0.1708 |
| Main scanning direction $\left\| f_{sY} \cdot \left( \dfrac{(n_{d1} - 1)}{f_{(1)y}} + \dfrac{(n_{d2} - 1)}{f_{(2)y}} \right) \right\|$ | 0.4105 |
| Sub scanning direction $\left\| \left( \dfrac{1}{R_{1x}} - \dfrac{1}{R_{2x}} \right) + \left( \dfrac{1}{R_{3x}} - \dfrac{1}{R_{4x}} \right) f_{sX} \right\|$ | 0.1977 |

TABLE 15-continued

Conditions for Fourth Preferred Embodiment

| | |
|---|---|
| $\delta = \dfrac{\min(S_b \cdot S_a)}{\max(S_b \cdot S_a)}$ | 0.4325 |
| $\eta_{max} = \dfrac{\max(S_b \cdot S_a)}{(S_{b0} \cdot S_{a0})}$ | 0.0705 |
| $\eta_{min} = \dfrac{\min(S_b \cdot S_a)}{(S_{b0} \cdot S_{a0})}$ | 0.0305 |

TABLE 16

The maximum diameter(μm) of geometric spot on target drum

| | Y | | | | | | | | |
|---|---|---|---|---|---|---|---|---|---|
| | −107.460 | −96.194 | −84.415 | −72.368 | −60.215 | −48.060 | −35.956 | −23.920 | 0.000 |
| Max diameter | 9.49E−03 | 7.14E−03 | 7.16E−03 | 8.30E−03 | 7.79E−03 | 7.18E−03 | 5.82E−03 | 7.87E−03 | 1.22E−02 |

In a fifth preferred embodiment, the two-element fθ lens comprises a first lens and a second lens. The first lens is a biconvex lens, the second lens is a meniscus lens of which the concave surface is disposed on a side of a MEMS mirror and a first optical surface and a second optical surface of the first lens, a third optical surface and a fourth optical surface of the second lens are all Aspherical surfaces designed in accordance with the Equation (2), and the optical characteristics and the Aspherical surface parameters are listed in Tables 17 and 18.

TABLE 17

Optical Characteristics of fθ Lens for Fifth Preferred Embodiment

| optical surface | radius (mm) | d, thickness | nd, refraction index |
|---|---|---|---|
| MEMS Reflection | | | |
| R0 | ∞ | 15.45 | 1 |
| lens 1 | | | 1.533 |
| R1 (Anamorphic) | | | |
| R1x | 34.716 | 9.96 | |
| R1y* | 158.192 | | |
| R2 (Anamorphic) | | | |
| R2x* | −18.949 | 10.00 | |
| R2y* | −96.958 | | |
| lens 2 | | | 1.533 |
| R3 (Anamorphic) | | | |
| R3x* | 44.054 | 12.00 | |
| R3y* | −271.406 | | |
| R4 (Anamorphic) | | | |
| R4x* | −88.763 | 23.38 | |
| R4y* | −518.307 | | |
| drum R5 | ∞ | 0.00 | |

*Aspherical surface

TABLE 18

Parameters of Aspherical Surface of Optical Surface for Fifth Preferred Embodiment Anamorphic equation Coefficient

| optical surface | Ky, Conic Coefficient | 4th Order Coefficient (AR) | 6th Order Coefficient (BR) | 8th Order Coefficient (CR) | 10th Order Coefficient (DR) |
|---|---|---|---|---|---|
| R1* | 3.2139E+00 | 2.7416E−06 | −4.5115E−10 | 0.0000E+00 | 0.0000E+00 |
| R2* | −4.0120E+00 | −6.4991E−08 | 5.5193E−09 | 0.0000E+00 | 0.0000E+00 |
| R3* | 1.0000E+01 | −2.3351E−05 | 1.5929E−09 | 0.0000E+00 | 0.0000E+00 |
| R4* | −1.0000E+01 | 6.3319E−07 | 4.3735E−10 | 0.0000E+00 | 0.0000E+00 |

Figure 11:
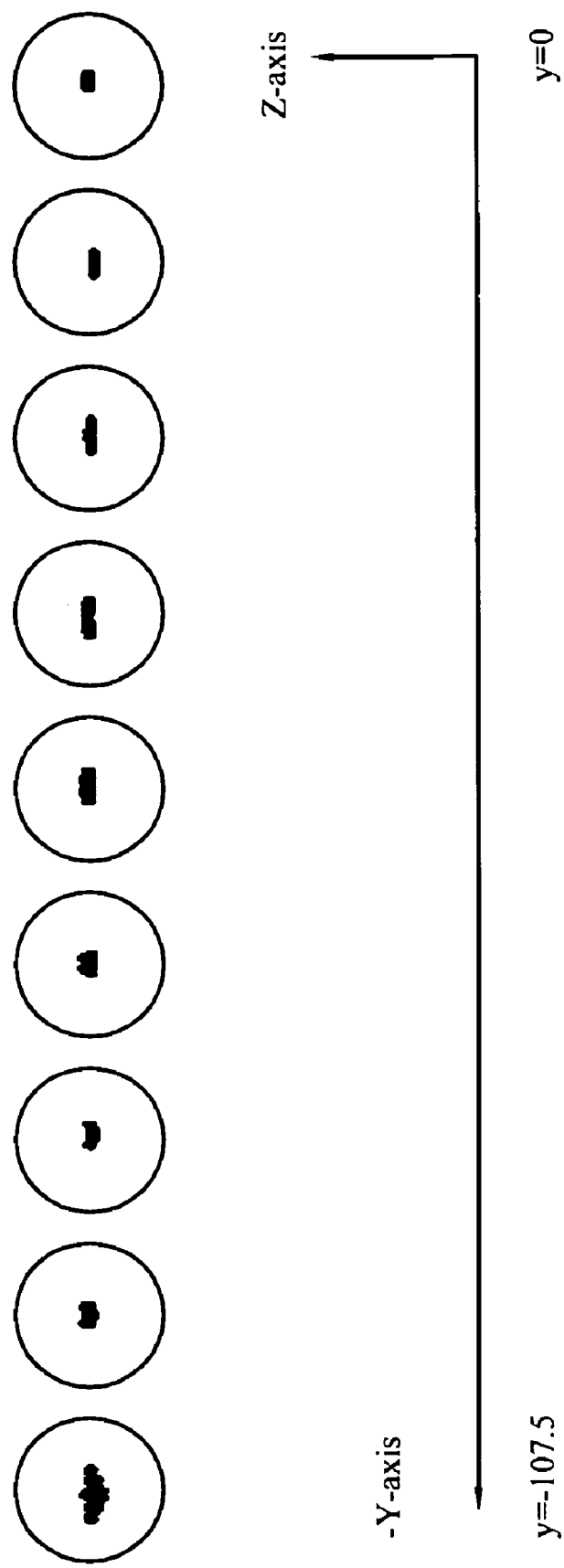
FIG. 11 shows spots in accordance with a fifth preferred embodiment of the present invention.

| | Kx, Conic Coefficient | 4th Order Coefficient (AP) | 6th Order Coefficient (BP) | 8th Order Coefficient (CP) | 10th Order Coefficient (DP) |
|---|---|---|---|---|---|
| R1* | −1.4366E+01 | 2.7499E−01 | 0.0000E+00 | 0.0000E+00 | 0.0000E+00 |
| R2* | 1.8682E+00 | −5.6172E+00 | 0.0000E+00 | 0.0000E+00 | 0.0000E+00 |
| R3* | 5.4516E+00 | −6.7539E−01 | 0.0000E+00 | 0.0000E+00 | 0.0000E+00 |
| R4* | −7.8410E+00 | 2.7309E−01 | 2.2993E−02 | 0.0000E+00 | 0.0000E+00 | scanned into scan lights and focused on the drum 15 to form a smaller spot 6 and satisfy the conditions of Equations (4) to (10) as listed in Table 19. The maximum diameter (μm) of geometric spot on the drum at distance Y (mm) from the center point along the drum surface is shown in Table 20. The distribution of spot sizes from the central axis to the left side of the scan window 3 is outlined as FIG. 11, where the diameter of unity circle is 0.05 mm.

TABLE 19

Conditions for Fifth Preferred Embodiment

| | |
|---|---|
| $\dfrac{d_3 + d_4 + d_5}{f_{(1)Y}}$ | 0.3927 |
| $\dfrac{d_5}{f_{(2)Y}}$ | −0.0212 |
| Main scanning direction $\left\| f_{sY} \cdot \left( \dfrac{(n_{d1} - 1)}{f_{(1)y}} + \dfrac{(n_{d2} - 1)}{f_{(2)y}} \right) \right\|$ | 0.5312 |
| Sub scanning direction $\left\| \left( \dfrac{1}{R_{1x}} - \dfrac{1}{R_{2x}} \right) + \left( \dfrac{1}{R_{3x}} - \dfrac{1}{R_{4x}} \right) f_{sX} \right\|$ | 0.8038 |
| $\delta = \dfrac{\min(S_b \cdot S_a)}{\max(S_b \cdot S_a)}$ | 0.4633 |
| $\eta_{max} = \dfrac{\max(S_b \cdot S_a)}{(S_{b0} \cdot S_{a0})}$ | 0.0993 |
| $\eta_{min} = \dfrac{\min(S_b \cdot S_a)}{(S_{b0} \cdot S_{a0})}$ | 0.0483 |

Referring to FIG. 6 for the optical path chart of an optical surface of the two-element fθ lens 13, $f_{(1)Y}$=115.57, $f_{(2)Y}$=−1099.047, $fs_X$=21.265, $fs_Y$=128.663 (mm), so that the scan light can be converted into a scan spot with a linear relation of distance and time, and the spots with spot 3 $S_{a0}$=14.19 and $S_{b0}$=3109.99 (μm) on the MEMS reflecting mirror 10 are

TABLE 20

The maximum diameter (μm) of geometric spot on target drum

| | Y | | | | | | | |
|---|---|---|---|---|---|---|---|---|
| | −107.460 | −96.156 | −84.406 | −72.426 | −60.346 | −48.240 | −36.147 | −24.079 | 0.000 |
| Max(2Ga, 2Gb) | 2.91E−02 | 1.66E−02 | 1.73E−02 | 1.08E−02 | 1.50E−02 | 1.92E−02 | 1.77E−02 | 1.14E−02 | 7.79E−02 |

In view of the aforementioned preferred embodiments, the present invention at least has the following effects:

(1) With the two-element fθ lens of the invention, the scanning is corrected the phenomenon of non-uniform speed which results in decreasing or increasing the distance between spots on an image surface of a MEMS reflecting mirror with a simple harmonic movement with time into a constant speed scanning, so that the laser beam at the image side is projected for a uniform speed scanning and an equal distance between any two adjacent spots can be achieved for the image on a target.

(2) With the two-element fθ lens of the invention, the distortion correction is provided for correcting the main scanning direction and sub scanning direction of the scan light, so that the image size of the spot focused at the target can be decreased.

(3) With the two-element fθ lens of the invention, the distortion correction is provided for correcting the main scanning direction and the sub scanning direction of the scan light, so as to focus the spot size focused and imaged at the target.

What is claimed is:

1. A two-element fθ lens used for a micro-electro mechanical system (MEMS) laser scanning unit, said MEMS laser scanning unit comprising a light source for emitting laser beam, a MEMS reflecting mirror for reflecting said laser beam emitted by said light source into a scanning light by resonant oscillation, and a target provided for sensing light, said two-element fθ lens being disposed between said target and said MEMS reflecting mirror, said two-element fθ lens comprising:

a first lens, in a biconvex shape; and a second lens, in a meniscus shape and having a concave surface toward said MEMS reflecting mirror, located between said first lens and said target;

wherein, said first lens included a first optical surface and a second optical surface, at least one of said optical surfaces is an aspherical surface in both main scanning direction and sub scanning direction of said MEMS laser scanning unit;

wherein, said second lens included a third optical surface and a fourth optical surface, at least one of said optical surfaces is an aspherical surface in both main scanning direction and sub scanning direction of said MEMS laser scanning unit;

wherein, said two-element fθ lens converts the non-linear relation of reflecting angle with time of said scanning light into a linear relation between the distance of the scan spot with time and focusing the scanning light to form an image at said target.

2. The two-element fθ lens of claim 1, wherein the main scanning direction satisfies the conditions of:

$$0.1 < \frac{d_3 + d_4 + d_5}{f_{(1)Y}} < 0.6;$$

$$-0.4 < \frac{d_5}{f_{(2)Y}} < -0.02;$$

wherein, $f_{(1)Y}$ is the focal length of the first lens in the main scanning direction, and $f_{(2)Y}$ is the focal length of the second lens in the main scanning direction, θ is the reflection angle of the MEMS lens, and $d_3$ is the distance from the second optical surface to the third optical surface on the optical axis Z, and $d_4$ is the thickness of the second lens along the optical axis Z, and $d_5$ is the distance from the fourth optical surface to the target side on the optical axis Z.

3. The two-element fθ lens of claim 1, further satisfying the conditions of:

in the main scanning direction $$0.1 < \left| f_{sY} \cdot \left( \frac{(n_{d1} - 1)}{f_{(1)y}} + \frac{(n_{d2} - 1)}{f_{(2)y}} \right) \right| < 1.2;$$

in the sub scanning direction $$0.086 < \left| \left( \frac{1}{R_{1x}} - \frac{1}{R_{2x}} \right) + \left( \frac{1}{R_{3x}} - \frac{1}{R_{4x}} \right) f_{sX} \right| < 1.0;$$

wherein, $f_{(1)Y}$ and $f_{(1)X}$ are the focal lengths of the first lens in the main scanning direction and the sub scanning direction respectively, and $f_{(2)Y}$ and $f_{(2)X}$ are the focal lengths of the second lens in the main scanning direction and the sub scanning direction respectively, $f_s$ is a combined focal length of the two-element fθ lens, and $R_{ix}$ is the radius of curvature of the i-th optical surface in the X direction; and $n_{d1}$ and $n_{d2}$ are refraction indexes of the first lens and the second lens respectively.

4. The two-element fθ lens of claim 1, wherein the ratio of the largest spot and the smallest spot size satisfies the conditions of:

$$0.4 < \delta = \frac{\min(S_b \cdot S_a)}{\max(S_b \cdot S_a)};$$

wherein, $S_a$ and $S_b$ are the lengths of any spot formed by a scan light on the target in the main scanning direction and the sub scanning direction, and δ is the ratio of the smallest spot and the largest spot on the target.

5. The two-element fθ lens of claim 1, wherein the ratio of the largest spot on the target and the smallest spot on the target satisfies the conditions of:

$$\eta_{max} = \frac{\max(S_b \cdot S_a)}{(S_{b0} \cdot S_{a0})} < 0.10;$$

$$\eta_{min} = \frac{\min(S_b \cdot S_a)}{(S_{b0} \cdot S_{a0})} < 0.10;$$

wherein, $S_{a0}$ and $S_{b0}$ are the lengths of a spot formed by a scan light on a reflecting surface of the MEMS reflecting mirror in the main scanning direction and the sub scanning direction, and Sa and $S_b$ are the lengths of any spot formed by a scan light on the target in the main scanning direction and the sub scanning direction, and $\eta_{max}$ is the maximum ratio value of the largest spot on the target with the spot on the reflecting surface of the MEMS reflecting mirror, and $\eta_{min}$ is the minimum ratio value of the largest spot on the target with the spot on the reflecting surface of the MEMS reflecting mirror.

* * * * *